No. 728,356. PATENTED MAY 19, 1903.
N. BECK & R. DIOR.
BURNER FOR LIQUID FUEL.
APPLICATION FILED MAY 15, 1902.

NO MODEL.

Witnesses:

Inventors:

No. 728,356. Patented May 19, 1903.

UNITED STATES PATENT OFFICE.

NICOLAS BECK AND RÉNÉ DIOR, OF GRANVILLE, FRANCE.

BURNER FOR LIQUID FUEL.

SPECIFICATION forming part of Letters Patent No. 728,356, dated May 19, 1903.

Application filed May 15, 1902. Serial No. 107,532. (No model.)

*To all whom it may concern:*

Be it known that we, NICOLAS BECK and RÉNÉ DIOR, engineers, citizens of the Republic of France, and residents of St. Nicolas Usines, Granville, France, have invented new and useful Improvements in Burners for Liquid Fuel, of which the following is a specification.

This invention relates to a burner for liquid fuel—alcohol, benzol, or similar mineral oils—which is to be evaporated automatically in the burner and used for heating or lighting purposes after having been mixed with air, as usual.

This improved burner has the advantage that it allows very quick evaporation of the fuel, that it is absolutely safe against explosions, that the quantities of the gas and air to be mixed can be regulated as required, and that the flame can be extinguished very easily.

In the accompanying drawings the improved burner is shown as applied to a lamp for lighting an incandescent mantle.

Figure 1:
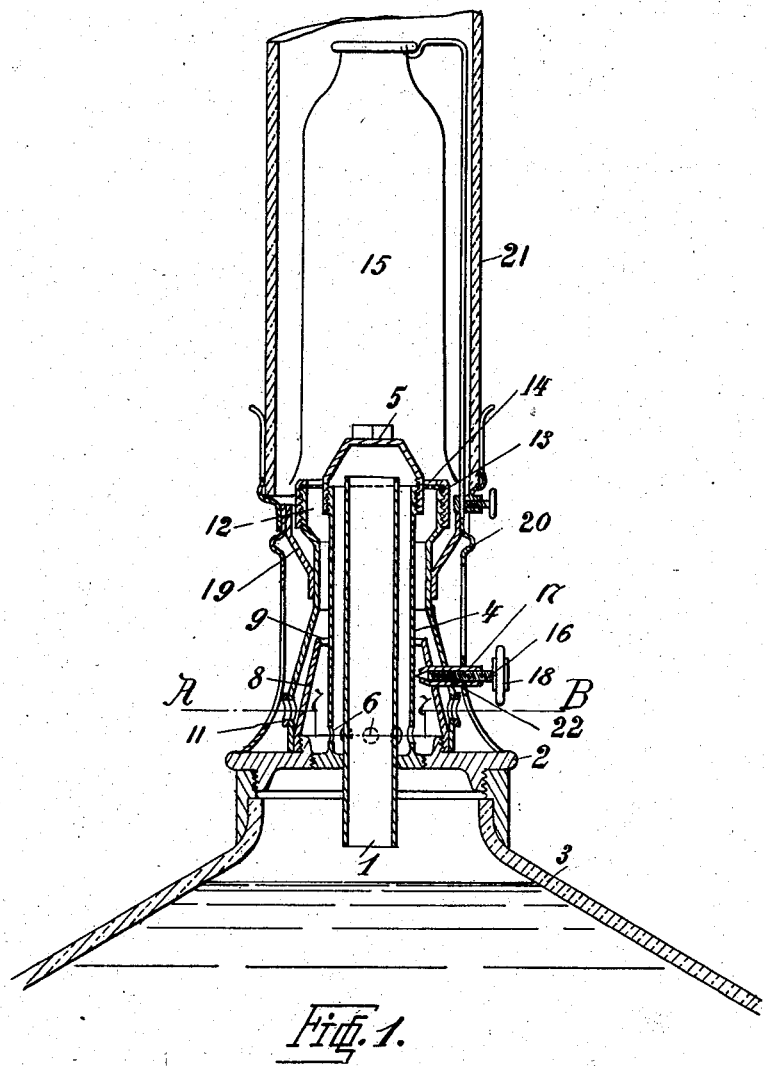
Figure 2:
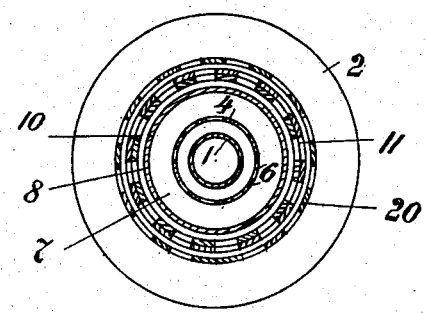

Figure 1 is vertical section through the burner. Fig. 2 is a section on line A B of Fig. 1.

The burner, which is hereinafter only described as used in connection with a lamp, can be used equally well for heating purposes.

The burner consists of the wick-tube 1, which is air-tightly mounted in the base-plate 2 of the frame and projects into the basin 3 for the liquid fuel. The wick-tube 1 is covered by a gas-tube 4, the lower end of which is screwed or otherwise fastened on the base-plate 2, and the upper end of which is hermetically closed by a cap 5. This cap 5 is air-tightly connected with the gas-tube 4 by screw-threads or in any other suitable manner. At the bottom end of the air-tube outlets 6 for the escape of the gas are provided, which open into the gas-chamber 7, which is formed at the bottom end outside the gas-tube 4 by means of a conical shield 8. This conical shield 8 becomes narrower toward the top and leads up to somewhat below the middle of the gas-tube 4. The upper rim of the conical shield 8 nearly touches the outer wall of the gas-tube, so that a small ring-shaped opening 9 for the escape of the gases is provided. The conical shield 8 may eventually be closed at the top, in which case the top plate is perforated to allow the escape of the gases. The conical shield 8, as well as the upper part of the gas-tube 4, is surrounded by an outer shell 10, which extends upward to somewhat below the upper end of the wick-tube 1. This outer shell has holes 11 at the bottom, which serve as inlets for the air. The free space 12 between the outer shell 10 and the gas-tube 4 above the top end of the conical shield 8 serves as a mixing-chamber for the gas and the outer air and is covered at the top by a plate 13, which has perforations 14 for the escape of the mixture of gas and air.

If the burner is to be used for lighting purposes in connection with an incandescent mantle, the incandescent mantle 15 is suspended in the well-known manner, so that its bottom edge surrounds the top plate 13 of the mixing-chamber.

In the wall of the conical shield 8 an outlet 17 is provided, which is closed by means of a screw-valve 16, to be actuated by a hand-wheel 18 or in any other suitable manner.

On the outer shell 10 a cup 19 is arranged, which serves for the purpose of previously heating the burner.

The burner works in the following manner: To start the operation of the burner, the cup 19 is filled with alcohol, the flame of which surrounds the upper part of the burner, which is thereby heated and causes the alcohol or other liquid fuel with which the wick is soaked to evaporate at the upper end of the gas-tube 4. The gaseous vapors fill the gas-tube 4 and the gas-chamber 7, formed by the conical shield 8, and escape through the openings 9 at the top end of the conical shield 8 and enter the mixing-chamber 12. In the mixing-chamber 12 the gaseous vapors mix with the air which flows in through the holes 11 at the bottom end of the outer shell and the gases ready for lighting flow out through the perforations 14 in the top plate 13 of the outer shell after they have ignited at the flame of the cup 19. The burner is now in operation and the evaporation and combustion are automatically sustained.

The gallery 20 of the chimney 21 can be provided with adjustable openings to regulate the admittance of the air to the burner.

To extinguish the flame, it is only necessary to open the screw-valve 16, so that the escape 22 in the valve is opened, whereupon the gas contained in the gas-chamber 7 escapes before getting to the mixing-chamber 12, so that the flame is extinguished for want of fuel.

Instead of a circular gas-space, as provided by the gas-tube 4 hereinbefore described, several gas-tubes can be used branching off from the cap 5, arranged over the top end of the wick-tube 1.

Having fully described our invention, what we claim, and desire to secure by Letters Patent, is—

A burner for liquid fuel—alcohol, benzol and the like—comprising in combination with the wick-tube, a gas-tube inclosing the wick-tube, a cap at the top of the gas-tube connected with the same, a conical shield at the bottom of the gas-tube, extending upward to somewhat below the middle of the gas-tube and communicating with the interior of the same by means of openings provided at the bottom end of the gas-tube, an outer shell with holes for the inlet of air at its bottom surrounding the conical shield of the gas-tube, a perforated plate closing the outer shell at the top and a screw-valve in the wall of the conical shield opening to the outer air and allowing the extinction of the flame, substantially as described and shown and for the purpose set forth.

In testimony whereof we have hereunto set our hands in presence of two subscribing witnesses.

NICOLAS BECK.
RÉNÉ DIOR.

Witnesses:
M. LAUNUN,
CH. PELL.